(12) United States Patent
Lim (10) Patent No.: US 11,764,379 B2
(45) Date of Patent: Sep. 19, 2023

(54) AIR CLEANER AND FUEL CELL SYSTEM INCLUDING THE SAME

(71) Applicant: HYUNDAI MOBIS Co., Ltd., Seoul (KR)

(72) Inventor: Seung Taek Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/569,706

(22) Filed: Jan. 6, 2022

(65) Prior Publication Data

US 2022/0216492 A1 Jul. 7, 2022

(30) Foreign Application Priority Data

Jan. 7, 2021 (KR) .......................... 10-2021-0002170

(51) Int. Cl.
*H01M 8/0662* (2016.01)
*H01M 8/04082* (2016.01)
*H01M 8/04746* (2016.01)

(52) U.S. Cl.
CPC ..... *H01M 8/0687* (2013.01); *H01M 8/04201* (2013.01); *H01M 8/04753* (2013.01); *H01M 2250/20* (2013.01)

(58) Field of Classification Search
CPC ........... H01M 8/0687; H01M 8/04201; H01M 8/04753; H01M 2250/20; H01M 8/04089; H01M 8/2475; H01M 8/2484
See application file for complete search history.

(56) References Cited

U.S. PATENT DOCUMENTS

| 2009/0017745 A1* | 1/2009 | Kum ................. H01M 8/04089 454/156 |
| 2019/0173118 A1* | 6/2019 | Oguro ..................... H01M 8/04 |
| 2019/0379082 A1* | 12/2019 | Jung .................. H01M 8/2475 |

* cited by examiner

*Primary Examiner* — Stewart A Fraser
(74) *Attorney, Agent, or Firm* — Morgan, Lewis & Bockius LLP (57) ABSTRACT

An air cleaner includes a body disposed inside a stack case which is to store a fuel cell stack, and having an upper portion detachably coupled to a top plate of the stack case, and a filter disposed inside the body to filter air introduced into the body.

14 Claims, 9 Drawing Sheets

AIR CLEANER AND FUEL CELL SYSTEM INCLUDING THE SAME

CROSS-REFERENCE TO RELATED APPLICATION

This application claims the benefit of priority to Korean Patent Application No. 10-2021-0002170, filed in the Korean Intellectual Property Office on Jan. 7, 2021, the entire contents of which are incorporated herein by reference.

TECHNICAL FIELD

The present disclosure relates to an air cleaner and a fuel cell system including the same.

BACKGROUND

A typical fuel cell system supplies fuel gas containing hydrogen to an anode of a fuel cell stack, supplies air to a cathode of the fuel cell stack, and electrochemically makes a reaction between the fuel gas and oxygen in the air through an electrolyte membrane, thereby producing power.

Such a fuel cell system includes an air cleaner to filter out foreign substances. A conventional air cleaner is disposed inside at a lower portion of a stack case, and an inlet of an inlet duct of the air cleaner is disposed at an upper portion of the stack case. In other words, since the inlet duct should be formed to connect the lower portion of the stack case to the upper portion of the stack case, the inlet duct occupies a wider inner space of the stack case. In addition, as a moving line of the air to be introduced into the inlet duct is increased, the power consumption of a compressor is increased. In addition, as the conventional air cleaner is mainly disposed inside the lower portion of the stack case, the conventional air cleaner has a difficulty in mounting.

In addition, according to the conventional air cleaner, it may be difficult to replace an inner filter with new one.

In addition, according to the conventional air cleaner, contaminated air is introduced from a stack. In this case, moisture contained in the air may produce an adverse effect on the performance of the compressor.

SUMMARY

The present disclosure has been made to solve the above-mentioned problems occurring in the prior art while advantages achieved by the prior art are maintained intact.

An aspect of the present disclosure provides an air cleaner and a fuel cell system including the same, capable of reducing power consumption of a compressor, simplifying the replacement of an inner filter, and reducing an amount of moisture contained in air introduced from a stack.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an air cleaner may include a body disposed inside a stack case which stores a fuel cell stack and having an upper portion detachably coupled to a top plate of the stack case, and a filter disposed inside the body to filter air introduced into the body.

According to an embodiment, the body may include an external inlet port provided to introduce external air to be supplied to the stack case from an outside of the stack case.

According to an embodiment, the body may further include a stack introducing passage provided to introduce air discharged from the fuel cell stack.

According to an embodiment, the stack introducing passage may include a main fluid passage extending through the center of a stack introducing pipe protruding out of the body, and a guide groove recessed into an inner surface of the stack introducing pipe, and provided to guide air, which is introduced into the main fluid passage, to flow in a reference direction while rotating about a specific axis extending in the reference direction, where the reference direction is a direction to introduce the air into the main fluid passage.

According to an embodiment, the guide groove may have the spiral form extending in the reference direction.

According to an embodiment, the stack introducing passage may further include a blocking member that protrudes inwardly from a part, which is adjacent to an end of the guide groove facing the reference direction, of the inner surface of the stack introducing pipe, and blocks moisture, which is introduced into the guide groove, from moving into the body by the centrifugal force.

According to an embodiment, the stack introducing passage may include a discharge hole extending through the guide groove to discharge the moisture, which is introduced into the guide groove, out of the stack introducing pipe.

According to an embodiment, the main fluid passage may have an inner diameter reduced toward in the reference direction.

According to an embodiment, the body may include a lower body having a lower portion connected to a duct to discharge air passing through the filter, and an upper body detachably coupled to the lower body to receive the filter in a space defined between the upper body and the lower body.

According to an embodiment, the upper body may include an upper case having an upper portion having an opening and a cover part disposed on the upper case to cover the opening of the upper case and having the external inlet port.

According to an embodiment, the upper body may further include a connecting member coupled to the upper portion of the upper case and the cover.

According to an embodiment, the cover part may be provided in a first hole formed by cutting a first region of a top plate of the stack case to form a continuous surface with the top plate.

According to an embodiment, the cover part may be derived from the first region.

According to an embodiment, the body may further include a first coupling part disposed in the lower body and a second coupling part disposed in the upper body and detachably coupled to the first coupling part.

According to an embodiment, the air cleaner may further include a duct connected to the lower portion of the body to discharge a duct passing through the filter.

According to another aspect of the present disclosure, a fuel cell system may include a stack case disposed under a seat of a vehicle to store a fuel cell stack, and an air cleaner inserted into the stack case, having an upper portion coupled to a top plate of the stack case, and including a stack introducing passage to introduce air discharged from the stack, and an external inlet port to introduce external air.

According to an embodiment, in the fuel cell system, the stack case and the seat of the vehicle may be spaced apart from each other by a specific distance in a vertical direction to form a space, the external inlet port may be disposed in an upper portion of the air cleaner and disposed in the top plate of the stack case, and the external air may be guided to the top plate of the stack case through the space to be introduced into the air cleaner through the external inlet port.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

Figure 1:
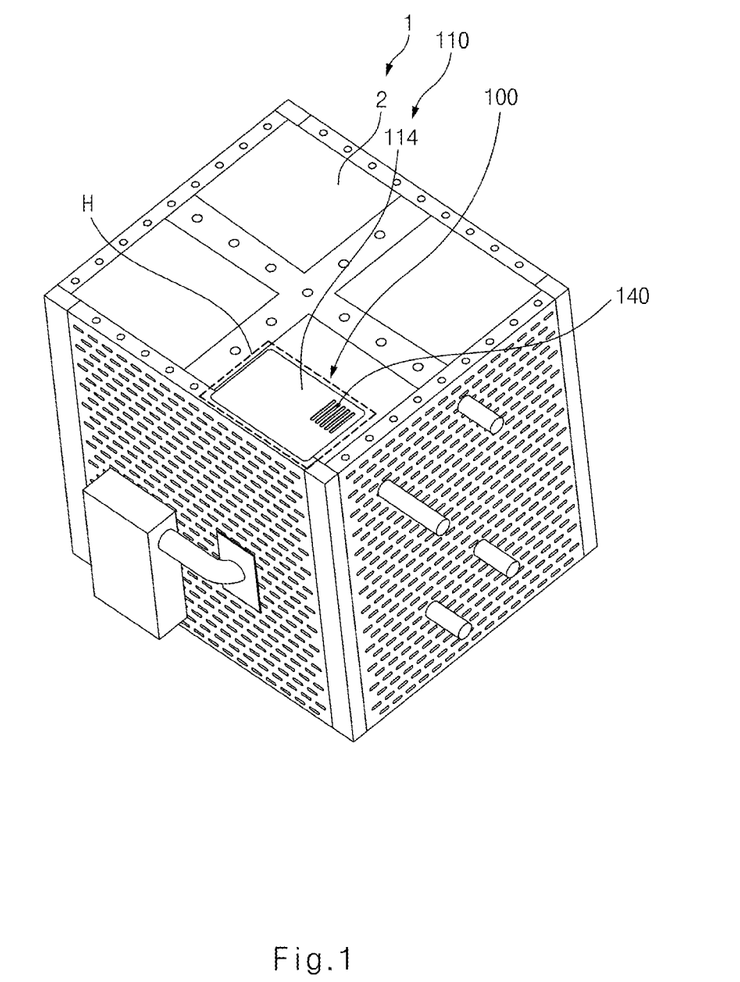
FIG. 1 is a view illustrating an air cleaner coupled to a stack case, according to an embodiment of the present disclosure.
Figure 2:
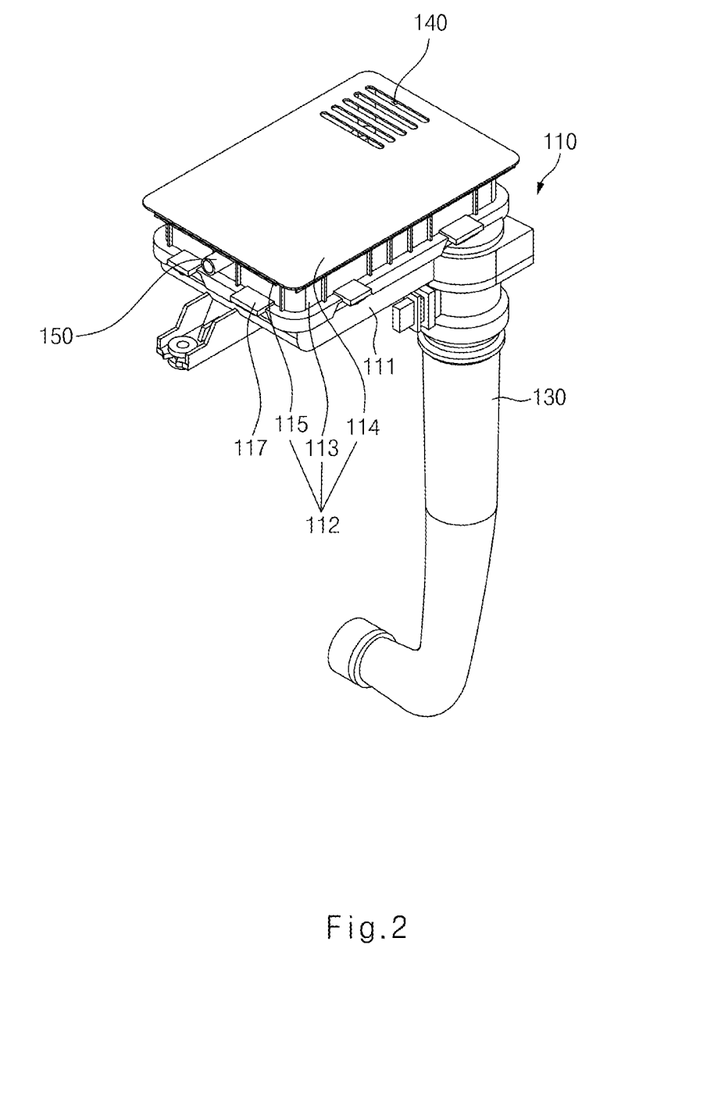
FIG. 2 is a perspective view of an air cleaner, according to an embodiment of the present disclosure.
Figure 3:
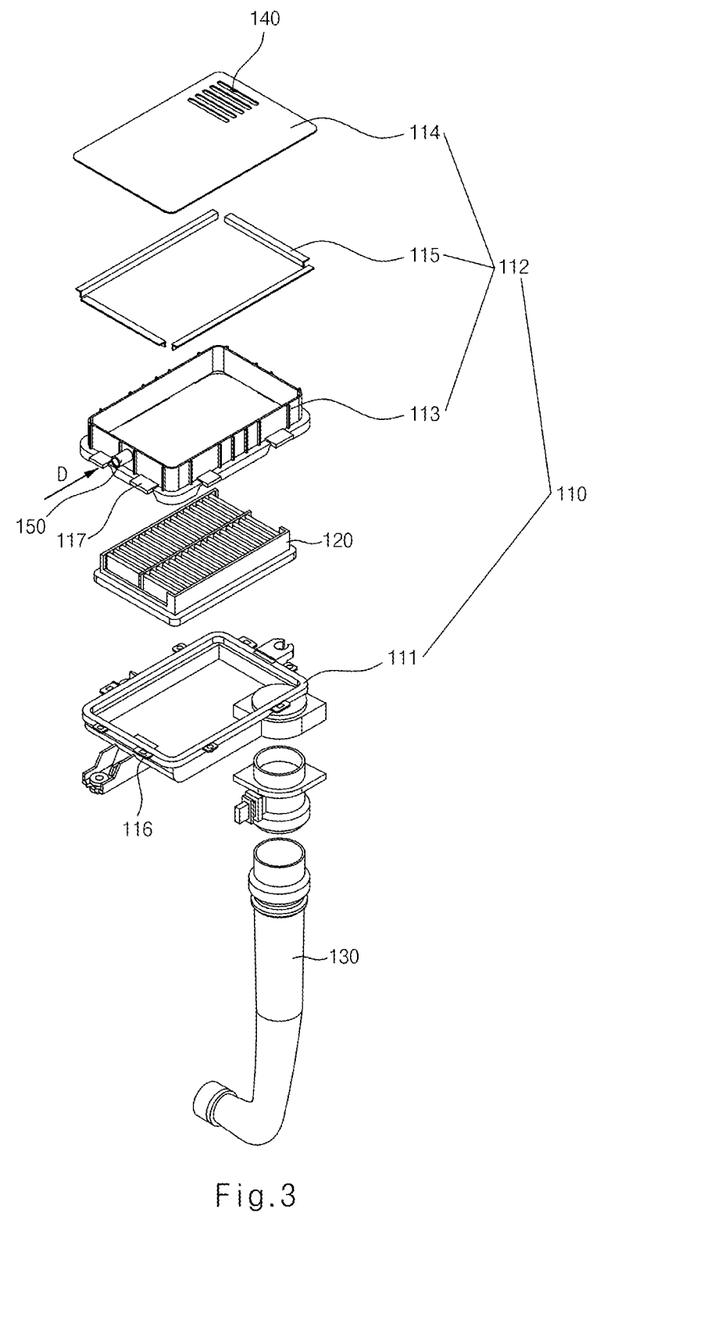
FIG. 3 is an exploded perspective view of FIG. 2.
Figure 4:
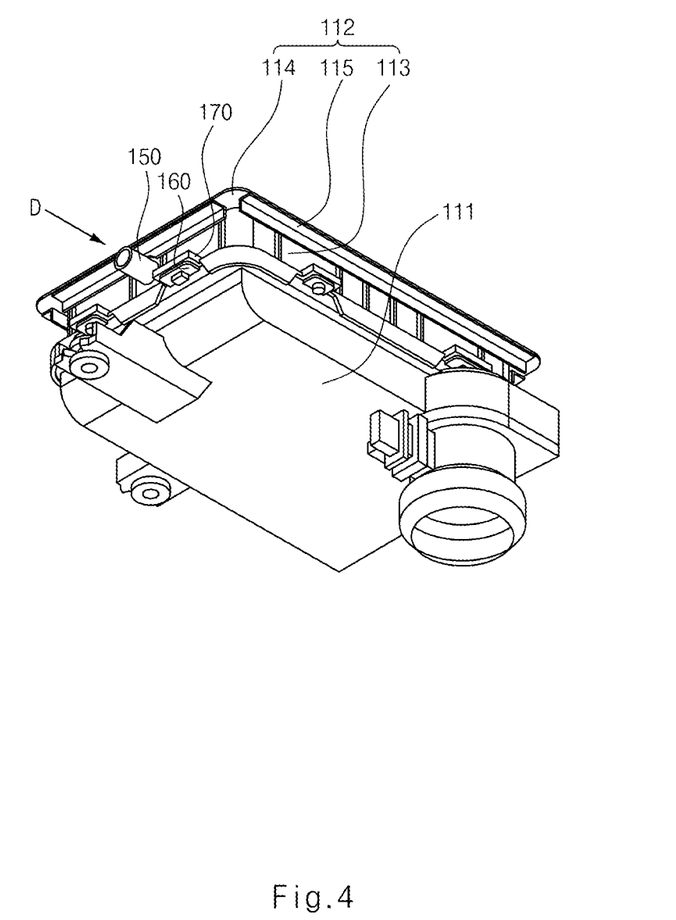
FIG. 4 is a perspective view illustrating the body of FIG. 2, when viewed in a different direction.

An air cleaner 100 according to an embodiment of the present disclosure relates to an air cleaner used in a fuel cell system. FIG. 1 is a view illustrating an air cleaner coupled to a stack case, according to an embodiment of the present disclosure. FIG. 2 is a perspective view of the air cleaner, according to an embodiment of the present disclosure. FIG. 3 is an exploded perspective view of FIG. 2. FIG. 4 is a perspective view of a body 110 of FIG. 2, when viewed in a different direction.

As illustrated in FIG. 3, the air cleaner 100 according to an embodiment of the present disclosure may include the body 110 and a filter 120. The air cleaner 100 according to an embodiment of the present disclosure may further include a duct 130. The body 110 may be provided to be disposed inside the stack case 1 in which the fuel cell stack is stored. The air cleaner 100 may further include a compressor (not illustrated). The compressor (not illustrated) may be provided to generate an air flow discharged to the duct 130 through the filter 120 after introducing air into the body 110.

As illustrated in FIG. 1, the body 110 may be provided on a top plate 2 of the stack case 1, such that an upper portion of the body 110 is detachably coupled to the top plate 2. For example, it may be understood that the body 110 is disposed inside an upper portion of the stack case 1. As illustrated in FIG. 3, the filter 120 may be disposed inside the body 110 to filter air introduced into the body 110. The duct 130 may be connected to a lower portion of the body 110 to discharge air passing through the filter 120.

According to the present disclosure, as the body 110 is disposed inside the upper portion of the stack case 1, a moving line for air, which is introduced from above the stack case 1, may be reduced. As the moving line for the air is reduced, the power consumption of the compressor (not illustrated) may be reduced.

<External Inlet Port 140>

In more detail, the body 110 may include an external inlet port 140. The external inlet port 140 may be provided to introduce external air, which is supplied from an outside of the stack case 1, into the stack case 1. The external inlet port 140 may be foiled to be adjacent to the top plate 2 of the stack case 1. As the external inlet port 140 is formed to be adjacent to the top plate 2 of the stack case 1, and even the body 110 is disposed inside the upper portion of the stack case 1, the moving line for moving the external air introduced is more shortened, so the power consumption of the compressor (not illustrated) may be reduced, when compared to the case that the body 110 is disposed inside the lower portion of the stack case 1.

<Stack Introducing Passage 150>

Figure 5:
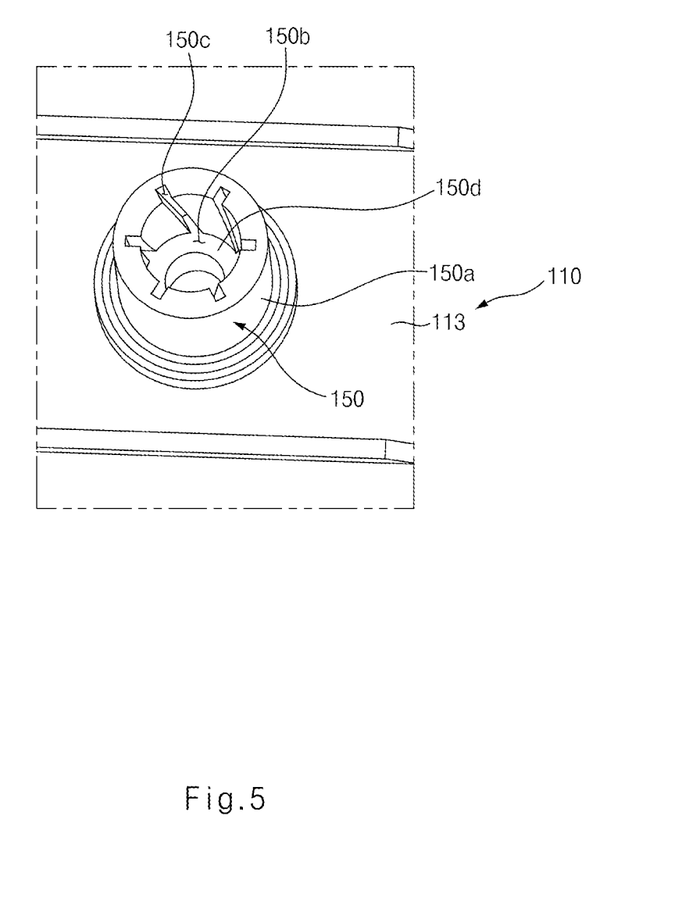
FIG. 5 is an enlarged view illustrating a stack introducing passage of an air cleaner, according to another embodiment of the present disclosure.
Figure 6:
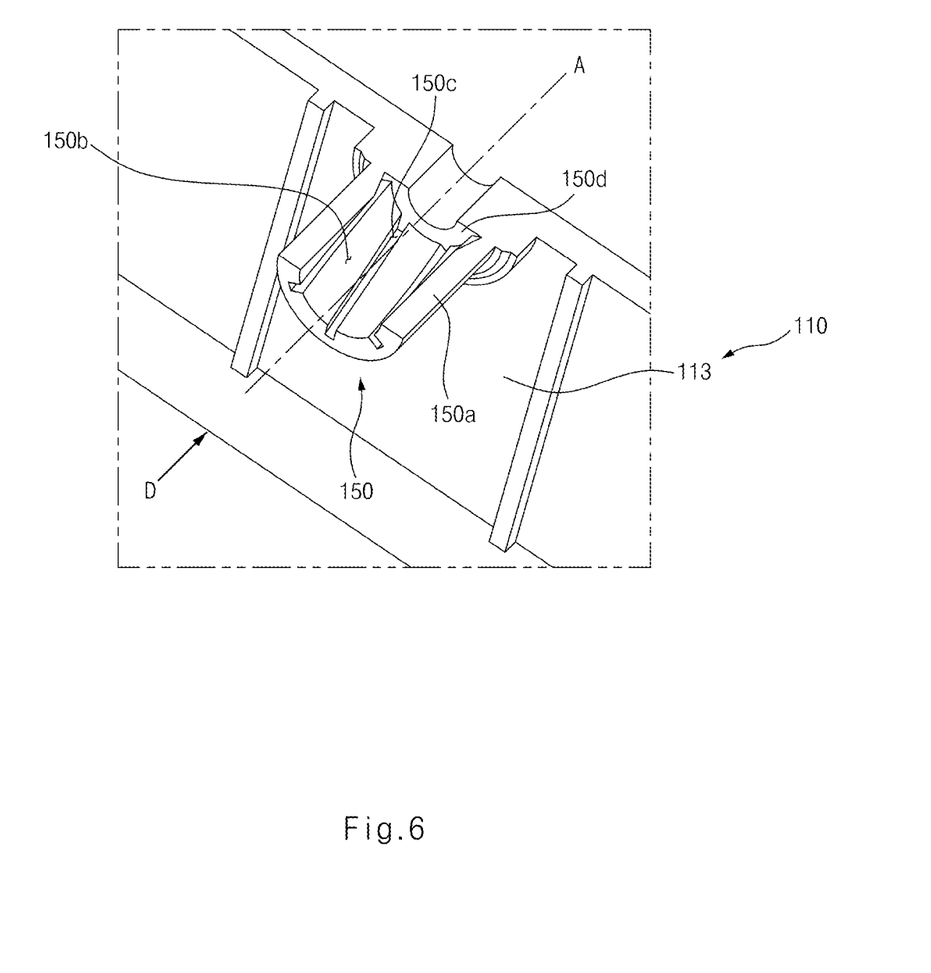
FIG. 6 is a cut-out perspective view of FIG. 5.

FIG. 5 is an enlarged view illustrating a stack introducing passage of an air cleaner, according to an embodiment of the present disclosure. FIG. 6 is a cut-out perspective view of FIG. 5. Hereinafter, a stack introducing passage will be described with reference to FIGS. 5 to 6.

The body 110 may further include a stack introducing passage 150. The stack introducing passage 150 may be provided to introduce air discharged from the fuel cell stack.

The stack introducing passage 150 may include a main fluid passage 150b and a guide groove 150c. The main fluid passage 150b may be formed through the center of a stack introducing pipe 150a protruding out of the body 110. The main fluid passage 150b may be formed to have an inner diameter gradually reduced in a reference direction 'D' (see FIG. 6). The reference direction 'D' may be a direction in which air is introduced into the main fluid passage 150b.

The guide groove 150c may be formed, as an inner surface of the stack introducing pipe 150a is recessed. The guide groove 150c rotates about a specific axis 'A' (see FIG. 6) extending in the reference direction 'D' to guide the air, which is introduced into the main fluid passage 150b, to flow in the reference direction 'D'. For example, the flow of the air introduced into the stack introducing passage 150 may be understood as having the form of a whirlwind moving forward in the reference direction 'D'.

In the air cleaner 100 according to an embodiment of the present disclosure, since the air flows in the reference direction 'D' while rotating through the guide groove 150c, centrifugal force of the air may be generated. The moisture contained in the air may be guided radially out of the main fluid passage 150b by the centrifugal force. The moisture guided to the inner surface of the stack introducing pipe 150a may be introduced into the guide groove 150c. The moisture introduced into the guide groove 150c may be discharged to the outside. A plurality of guide grooves 150c may be provided.

According to the present disclosure, since the guide groove 150c having the above-described form is provided in the stack introducing passage 150, the air introduced into the main fluid passage 150b may be rotated. Accordingly, the centrifugal force may be generated, thereby reducing an amount of moisture contained in the air introduced from the stack.

For example, the guide groove 150c may be provided in the spiral form extending in the reference direction 'D'.

The stack introducing passage 150 may further include a blocking member 150d. The blocking member 150d may protrude inwardly from a part, which is adjacent to an end of the guide groove 150c facing the reference direction 'D', of the inner surface of the stack introducing pipe 150a. The blocking member 150d may block the moisture, which is introduced into the guide groove 150c, from moving into the body 110 by the centrifugal force.

The stack introducing pipe 150a may include a discharge hole (not illustrated). The discharge hole (not illustrated) is formed through the guide groove 150c to discharge the moisture, which is introduced into the guide groove 150c, out of the stack introducing pipe 150a.

<Body 110>

As illustrated in FIG. 3, the body 110 may include a lower body 111 and an upper body 112. The lower body 111 may have a lower portion connected to the duct 130. The upper body 112 may be detachably coupled to the lower body 111. The upper body 112 and the lower body 111 may receive the filter 120 in the space defined by the upper body 112 and the lower body 111.

According to the present disclosure, as the body 110 of the air cleaner 100 is formed to be partitioned into the upper body 112 and the lower body 111, the filter 12 inside the body 110 may be simply replaced with new one.

The upper body 112 may include an upper case 113 and a cover part 114. The upper case 113 may be formed to have an open upper portion. The cover part 114 may be disposed on the upper case 113 to cover the opening of the upper case 113. The external inlet port 140 may be formed in the cover part 114.

The upper body 112 may further include a connecting member 115 coupled to the upper portion of the upper case 113 and the cover part 114. The upper case 113 and the cover part 114 may be coupled to each other through the connecting member 115

As illustrated in FIG. 1, the cover part 114 may be disposed in a first hole 'H' of the stack case 1. The first hole 'H' may be a hole formed by cutting a first region of the top plate 2. The cover part 114 may be disposed in the first hole 'H' to form a continuous surface with the upper plate 2.

In this case, the cover part 114 may be derived from the first region. For example, through the machining process of forming the external inlet port 140 in the first region, the first region of the cover part 114 may be utilized as the cover part 114.

According to an embodiment of the present disclosure, since the cover part 114 may be derived from the first region, material cost may be reduced. In addition, since the cover part 114 may be formed to correspond to the size of the first hole 'H', the cover part 114 may be provided to form the continuous surface with the top plate 2, after insertion.

As illustrated in FIGS. 3 and 4, the body 110 may include a first coupling part 116 and a second coupling part 117. The first coupling part 116 may be formed in the lower body 111. The second coupling part 117 may be formed in the upper body 112 and may be detachably coupled to the first coupling part 116. For example, the first coupling part 116 and the second coupling part 117 may have a door catch structure. However, the present disclosure is not limited thereto. For example, the first coupling part 116 and the second coupling part 117 may have various structures, such as a magnetic structure, as long as the first coupling part 116 and the second coupling part 117 are coupled to each other.

According to an embodiment of the present disclosure, since the first coupling part 116 and the second coupling part 117 may be separated from each other to separate the upper body 112 from the lower body 111, the filter 120 received in the body 110 may be easily replaced with new one.

<Fuel Cell System>

Figure 7:
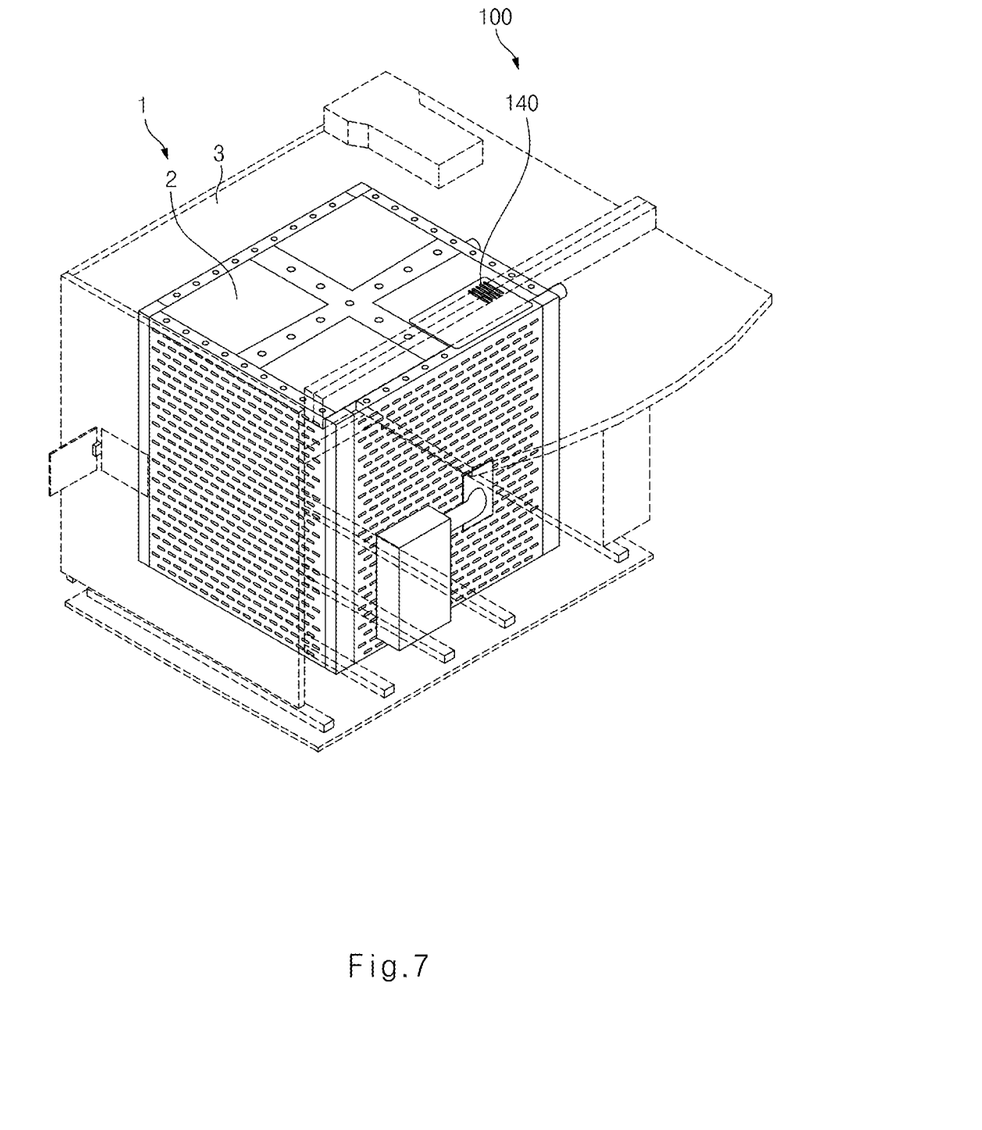
FIG. 7 is a view illustrating a fuel cell system, according to an embodiment of the present disclosure.
Figure 8:
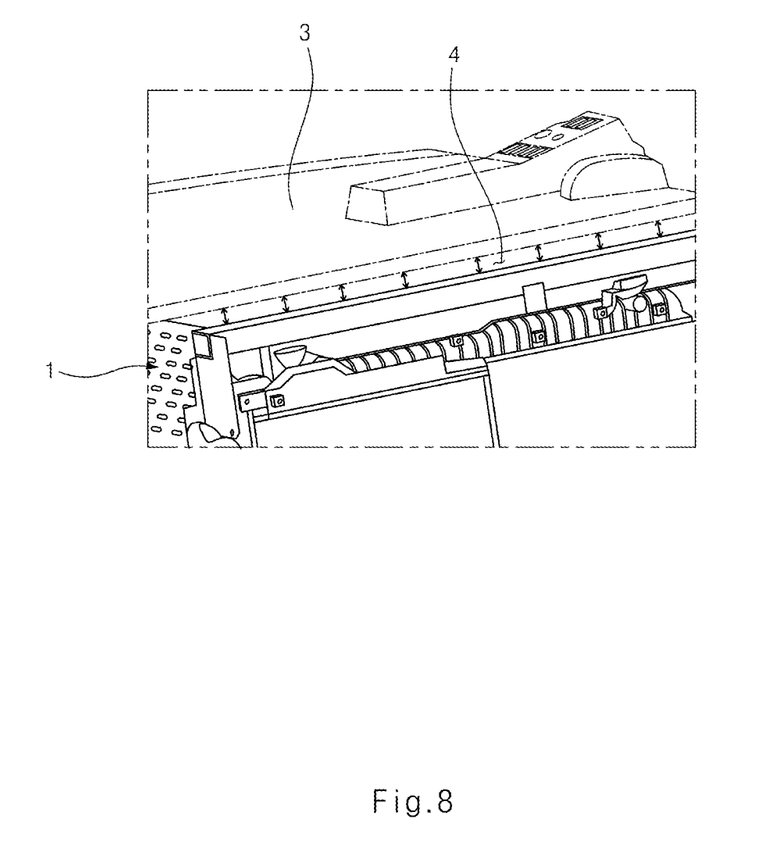
FIG. 8 is a partially enlarged view of FIG. 7.
Figure 9:
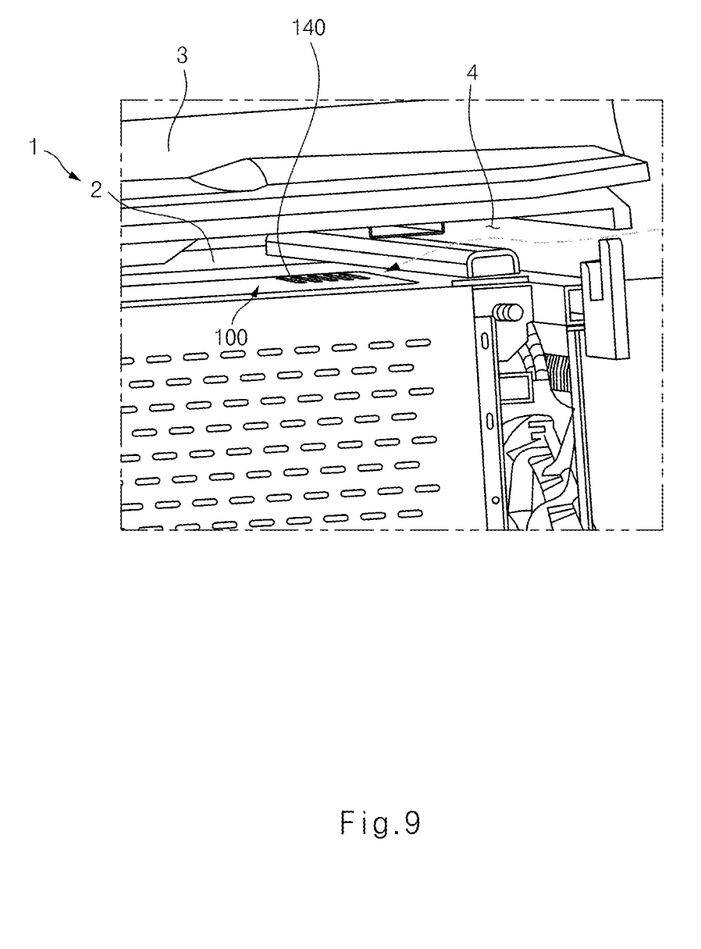
FIG. 9 is a partially enlarged view of FIG. 7 when viewed in a different direction.

FIG. 7 is a view illustrating a fuel cell system according to an embodiment of the present disclosure. FIG. 8 is a partially enlarged view of FIG. 7. FIG. 9 is a partially enlarged view of FIG. 7 when viewed in a different direction.

Hereinafter, a fuel cell system including the air cleaner 100 according to an embodiment of the present disclosure will be described in detail with reference to FIGS. 7 to 9. In particular, the description of the air cleaner 100 will be made with reference to FIGS. 1 to 6 described above. The fuel cell system according to an embodiment of the present disclosure may be a fuel cell system used in a forklift, but is not limited thereto.

The fuel cell system may include the stack case 1 and the air cleaner 100. A fuel cell stack may be stored in the stack case 1. The stack case 1 may be disposed under a seat 3 of a vehicle. In this case, as illustrated in FIG. 8, the stack case 1 and the seat 3 of the vehicle may be spaced apart from each other by a specific distance in a vertical direction to form a space 4.

The air cleaner 100 may be inserted into the stack case 1. The air cleaner 100 may be provided such that an upper portion of the air cleaner 100 is coupled to the top plate 2 of the stack case 1. The air cleaner 100 may include the stack inlet passage 150 (see FIG. 3) and the external inlet port 140 (see FIGS. 3 and 7). The stack introducing passage 150 may be provided to introduce air discharged from the fuel cell stack. External air may be introduced into the external inlet port 140.

As illustrated in FIG. 9, the external inlet port 140 may be formed in the upper portion of the air cleaner 100, and disposed in the top plate 2 of the stack case 1. In this case, external air may be guided to the top plate 2 of the stack case 1 through the space 4 and introduced into the air cleaner 100 through the external inlet port 140.

According to an embodiment, the external inlet port may be disposed in the top plate of the stack case such that external air is introduced, and the body may be disposed at the upper body of the stack case. Accordingly, the moving line for the air may be reduced, such that the power consumption of the compressor is reduced.

In addition, according to the present disclosure, as the body of the air cleaner may be formed to be partitioned into the upper body and the lower body, the replacement of the filter inside the body may be simplified.

In addition, according to the present disclosure, as the guide groove is formed in the stack introducing passage to introduce air, an amount of moisture contained in the air introduced into the stack may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An air cleaner comprising:
a body disposed inside a stack case which stores a fuel cell stack, and having an upper portion detachably coupled to a top plate of the stack case; and
a filter disposed inside the body to filter air introduced into the body,
wherein the body further includes:
an external inlet port configured to introduce external air to be supplied to the stack case from an outside of the stack case; and
a stack introducing passage configured to introduce air discharged from the fuel cell stack, and
wherein the stack introducing passage includes:
a main fluid passage extending through the center of a stack introducing pipe protruding out of the body; and
a guide groove recessed into an inner surface of the stack introducing pipe.

2. The air cleaner of claim 1, wherein
the guide groove is configured to guide air, which is introduced into the main fluid passage, to flow in a reference direction while rotating about a specific axis extending in the reference direction, where the reference direction is a direction to introduce the air into the main fluid passage.

3. The air cleaner of claim 2, wherein the guide groove has a spiral form extending in the reference direction.

4. The air cleaner of claim 2, wherein the stack introducing passage further includes:
a blocking member protruding inwardly from a part, which is adjacent to an end of the guide groove facing the reference direction, of the inner surface of the stack introducing pipe, and configured to block moisture, which is introduced into the guide groove, from moving into the body by centrifugal force.

5. The air cleaner of claim 4, wherein the stack introducing passage further includes:
a discharge hole extending through the guide groove to discharge moisture, which is introduced into the guide groove, out of the stack introducing pipe.

6. The air cleaner of claim 2, wherein the main fluid passage has an inner diameter gradually reduced in the reference direction.

7. The air cleaner of claim 1, further comprising
a duct connected to the lower portion of the body, and configured to discharge the air passing through the filter.

8. An air cleaner comprising:
a body disposed inside a stack case which stores a fuel cell stack, and having an upper portion detachably coupled to a top plate of the stack case; and
a filter disposed inside the body to filter air introduced into the body,
wherein the body further includes:
an external inlet port configured to introduce external air to be supplied to the stack case from an outside of the stack case, and
wherein the body further includes:
a lower body having a lower portion connected to a duct to discharge the air passing through the filter; and
an upper body detachably coupled to the lower body to receive the filter in a space defined between the upper body and the lower body.

9. The air cleaner of claim 8, wherein the upper body includes:
an upper case having an upper portion having an opening; and
a cover part disposed on the upper case to cover the opening of the upper case and having the external inlet port.

10. The air cleaner of claim 9, wherein the upper body further includes:
a connecting member coupled to the upper portion of the upper case and the cover part.

11. The air cleaner of claim 10, wherein the cover part includes a first hole, which is formed by cutting a first region of the top plate of the stack case, to form a continuous surface with the top plate.

12. The air cleaner of claim 11, wherein the cover part is derived from the first region.

13. The air cleaner of claim 8, wherein the body further includes:
a first coupling part disposed in the lower body; and
a second coupling part disposed in the upper body, and detachably coupled to the first coupling part.

14. A fuel cell system comprising:
a stack case disposed under a seat of a vehicle to store a fuel cell stack; and
an air cleaner inserted into the stack case, having an upper portion coupled to a top plate of the stack case, and including a stack introducing passage configured to introduce air discharged from the fuel cell stack, and an external inlet port configured to introduce external air,
wherein the stack case and the seat of the vehicle are spaced apart from each other by a specific distance in a vertical direction to form a space,
wherein the external inlet port is disposed in an upper portion of the air cleaner and disposed in the top plate of the stack case, and
wherein the external air is guided to the top plate of the stack case through the space to be introduced into the air cleaner through the external inlet port.

* * * * *